United States Patent Office 3,530,039
Patented Sept. 22, 1970

3,530,039
PROCESS FOR FERMENTATION AND
RECOVERY OF MICROBIAL CELLS
Ralph Bernheimer, Rifle, Colo., and Morton R. Friedman, New York, N.Y., assignors to Esso Research and Engineering Company, a corporation of Delaware
No Drawing. Filed Jan. 17, 1966, Ser. No. 520,858
Int. Cl. C12k 3/00
U.S. Cl. 195—96                                         9 Claims

ABSTRACT OF THE DISCLOSURE

Microorganisms secured in a biosynthesis fermentation using an aqueous growth medium containing a source of carbon, hydrogen, oxygen, and other essential cell nutrients, are separated from said aqueous growth medium by adding to said aqueous growth medium an immiscible organic liquid which preferentially wets said microorganisms to form an aqueous phase and an organic phase containing said microorganisms, and recovering the microorganisms from the organic phase.

---

This invention relates to a process for facilitating the recovery of microorganisms from an aqueous medium. In particular, this invention relates to a process, which comprises contacting an aqueous medium containing microbial cells with an immiscible organic liquid to form an aqueous phase and an organic phase; and recovering said microbial cells from said organic phase. More particularly, this invention relates to an improved method for harvesting microorganisms from an aqueous medium, which comprises, admixing an immiscible, volatile, chlorinated organic liquid with said aqueous medium at a temperature of between about 20° C. and about 55° C.; and recovering said microorganisms from the resulting organic phase. Still more particularly, this invention relates to a process, comprising (a) cultivating a microorganism in an aqueous growth medium comprising an inoculant of microorganism cells, a source of carbon, hydrogen and oxygen, and essential cell nutrients; (b) withdrawing a portion of said aqueous growth medium containing said microorganism cells; (c) admixing an immiscible, organic liquid with said portion to form an aqueous phase and an organic phase; and, (d) recovering said microorganism cells from said organic phase.

The present world shortage of protein, especially low-cost animal proteins for consumption by animals and humans, is well known. In an attempt to alleviate this protein shortage, there have recently been developed several biosynthetic processes whereby living protein can be provided by the growth of yeasts, fungi and/or bacteria on various carbon-containing substrate materials. One such technique involves growing various microorganisms on carbohydrate substrates. However, most of these processes require expensive vitamins and other growth mediums in order to insure the desired microorganism growth.

Another recent and even more promising technique for biosynthetically synthesizing food protein is the culture of microorganisms on petroleum substrates. This latter type of protein synthesis is usually conducted in an aqueous growth medium containing: hydrocarbon feed, an inoculant of the microorganism to be cultivated, oxygen, and essential cell nutrients. This type of protein synthesis allows the use of hydrocarbon feeds, which are less expensive than carbohydrates; and, does not usually require expensive growth factors such as vitamins, amino acids, etc. in order to insure proper microorganism growth.

A serious drawback to the wide aceptance of the biosynthetic technique employing hydrocarbons as the feed source is the fact that the product microorganism cells are often of very small size, e.g., between about 0.5 and about 5.0 microns and even smaller. With such small microorganism cells, it is difficult and often very expensive to achieve recovery of the microorganism cells. One factor leading to the expense in recovering product microorganisms cells is the difficulty in separating the cells from the aqueous growth medium containing them since the cells are generally present in low concentrations, e.g., between about 0.5 and about 5 weight percent. Another salient factor which increases recovery expense is the required removal of comparatively large amounts of water attracted to and maintained by and within the cells, including the interstitial water present in the cell walls of the microorganism. In addition, the similarity in densities of the microorganism and aqueous growth medium makes centrifugation difficult; and the tackiness of the microorganisms inhibits the use of filtration. These and other related factors serve to increase the over-all cost of recovering cultivated microorganisms.

Separation and dewatering procedures can amount to as much as 25% or higher of the total cost of producing microorganisms in a form suitable for use in high protein foods or food supplements. Hence it will be realized that any substantial improvement in effecting separation and dewatering of microorganism cells from the aqueous phase containing same will result in significant economic savings and thus reduce the overall cost of producing high protein foods and food supplements.

It is, therefore, an object of the present invention to provide a process for facilitating the separation of the relatively low concentration of microorganism cells from the comparatively larger aqueous volume containing said cells.

In a conventional biosynthesis, a microorganism is cultivated in an aqueous growth medium containing an inoculant of said microorganism, a source of carbon, hydrogen and oxygen, and essential cell nutrients. When cell growth reaches the desired level, a portion of the aqueous growth medium is withdrawn as effluent and the prodcells separated from the effluent, rendered non-viable and dried. The remainder of the effluent is, generally, recycled to the fermentation reactor wherein cultivation is continuing. In accordance with the present process, an immiscible organic liquid is admixed or intimately contacted with the aqueous effluent from the fermentation reactor before separation of the product cells. As a result of this admixing, the microbial cells agglomerate and appear to form a stabilized precipitate in the nature of an emulsion within the organic liquid. The exact manner in which the agglomeration proceeds is, however, not certain. Since the organic liquid is immiscible with the aqueous phase, the admixture easily separates and settles into an aqueous phase and an organic phase. As a result, the two phases can be easily separated, e.g., by centrifugation or decantation, and the product microbial cells recovered from the organic phase by evaporation of the organic solvent and drying of the cells.

The exact nature, substance and objects of this invention will be more clearly perceived and understood by referring to the following description and claims.

The organic liquid employed in the present process is, in general, an immiscible organic liquid which preferentially wets the microorganism cells. In addition, it is preferred, although not essential, that the organic liquid have a density greater than the aqueous phase with which it is admixed, i.e., it has a density ($D_{H_2O}$) of greater than 1.0; and that it be easily volatilized. These additional characteristics allow for greater ease in separating the organic phase and the aqueous phase and in drying the product microbial cells. For purposes of the instant process, an organic liquid is considered to be volatile if its heat of vaporization is below that of water. While the organic liquid need only have a heat of vaporization below that of water, it is preferred that its heat of vaporization be substantially below that of water for the reason that when such value is small, less heat is required to evaporate the organic liquid. The less heat required, the better the economics of cell recovery. For example, the heat of vaporization of water is 595.9 calories per gram. The heat of vaporization of carbon tetrachloride in comparison is 46.4 calories per gram.

While any immiscible organic liquid which preferentially wets the microorganism cells can be employed in the present process, there are some which are especially suitable. They include, for example, halogenated $C_1$–$C_4$ aliphatics (paraffins and olefins), preferably polyhalogenated $C_1$–$C_4$ aliphatics, carbon disulfide and toluene. Specific examples of the halogenated paraffins described hereinabove include: chloroform, methylene chloride, carbon tetrachloride, methylene bromide, trichlorofluoromethane, dichlorofluoromethane, 1-bromo-2-chloroethane, 1,1-dibromoethane, 1,1-dichloroethane, 1,2-dichloroethane, 1,1-dichloroethene, 1,2 - dichloroethene pentachloroethane, 1,1,1,2-tetrabromoethane, 1,1,1,2-tetrachloroethane, 1,1,2,2-tetrachloroethane, 1,1,2,2-tetrachloro-1,2-difluoroethane, ethyl bromide, 1,1-dichloropropane, 1,2-dichloropropane, 1,3-dichloropropane, 2,2-dichloropropane, bromotrichloromethane, 1,1,2 - tribromoethane, 1,1,1 - trichloroethane, 1,1,2-trichloroethane, 1,1,2-trichloro-1,2,2-trifluoroethane, 1-bromo-2-chloropropane, 2-bromo-1-chloropropane, 1,2-dibromopropane, 1,3-dibromopropane, 2,2-dibromopropane, 1,2,3 - trichloropropane, 1 - chlorobutane, 2 - bromobutane, 2 - bromo - 2 - methylpropane, etc. Thus, included within the description of the above-halogenated paraffins are those compounds containing one or similar or dissimilar halogens, i.e., bromine, chlorine and fluorine.

The contacting of the immiscible organic liquid and the aqueous phase containing the microorganisms can take place at or above the microorganism cell growth temperature which is conventionally conducted in a suitable fermentation reactor. Temperatures above the cell growth temperature can be employed but should be below that temperature at which significant protein degradation occurs. Preferably, admixing is performed at a temperature of between about 20° C. and about 55° C., preferably between about 35° C. and about 45° C., most preferably at about 40° C. Admixing can be performed in one or more mixing vessels followed by one or more settling vessels and can be accomplished by any conventional means such as by stirrers, etc. Alternatively, the aqueous effluent can be contacted with the organic liquid by means of a rotating disc contacting column or other countercurrent column.

Protein degradation refers to the molecular breakdown of the cell protein and essential amino acids into lesser molecular weight and/or nutritionally less desirable byproducts, e.g., by acid hydrolysis thereof, which byproducts are not capable of contributing to the protein and/or amino acid nutritional value of the non-viable microorganism cells or other nutritionally valuable products contained in the cells.

Residence time, i.e., the length of time that the immiscible organic liquid is in contact with the aqueous effluent, ranges in general from between about 1 minute and about 1 hour or more, preferably between about 10 minutes and about 30 minutes. No significant advantage results in extending the residence time to beyond about 30 minutes, but extended residence times beyond those described can be employed, if desired, since residence time is not critical.

The amount of immiscible organic liquid which is admixed with the aqueous effluent can vary over a wide range. In general, the volumetric ratio of organic liquid to aqueous effluent ranges between about 1:20 and about 100:1. Preferably, the volumetric ratio of organic liquid to aqueous effluent varies between about 1:10 and about 10:1, more preferably between about 1:3 and about 3:1.

The amount of organic liquid employed is not critical and will vary with its physical characteristics.

As previously indicated, when the organic liquid and aqueous effluent are admixed, the microorganism cells agglomerate within the organic liquid in the form of a stabilized precipitate or emulsion. The agglomerate either floats or sinks, depending on the nature of the organic liquid employed. Typically, 60 to 70 percent of the water in the initial aqueous effluent remains in the aqueous phase with the remaining 30 to 40 percent forming a suspension with the microorganism cells and organic liquid. Residence times of longer than 15 minutes result in a further breaking of the suspension and consequent transfer of water to the aqueous phase; however, substantially all of the cells contained in the aqueous effluent are found in the organic phase immediately after admixture and settling.

Since the organic liquid is immiscible with the aqueous effluent, admixing of the two results in the formation of an aqueous phase and an organic phase. These phases separate rapidly upon termination of mixing and can thereafter be easily segregated by any conventional method, e.g., by decantation. The organic liquid containing the microorganism cells is then subjected to a further separation (filtration, centrifugation) and/or volatilization step by any suitable technique such as by a freezing flask, drum dryer, spray dryer, flash dryer, etc., and the microorganism cells are thereby recovered. The volatilized organic liquid can be recovered, if desired, by known techniques and washed or treated, if necessary, and then recycled as fresh feed.

After the microorganism cells have been separated from the organic liquid, the cells can be passed to any suitable drying device, e.g., a spray dryer, to effect cell drying and render the cells completely non-viable. The dried product cells can then be used as a food supplement. However, drying of the cells is not mandatory as the separated cells can either be employed directly for non-food uses, e.g., in recovering intracellular chemicals such as esters; or, they can be rendered non-viable by procedures other than drying and then used as food supplements.

When fermentation is conducted to produce protein-rich microorganisms for feed purposes, the cells are rendered completely non-viable prior to such usage. Usually, the cells are killed by heating, in spray dryers, at the appropriate temperatures for the requisite time periods. The specific temperatures and times used in any given situation will depend on the specific microorganism being killed, the extent of pasteurization desired, etc. However, care should be exercised to avoid using such high temperatures as will degrade the cell protein.

Killing temperatures can range between about 150° F. and about 450° F. for time periods of between about 1 second and about 2 hours with the shorter time periods being employed at the higher temperatures and vice versa. Usually temperatures of between about 240° F. and about 380° F. and time periods ranging between about 5 seconds and about 15 minutes are satisfactory to render most microorganisms completely non-viable. Superatmospheric pressure, e.g., 2 to 50 atmospheres, can be and usually is employed when pasteurization is conducted using the lower temperatures, e.g., 240°–250° F., and the accompanying time periods.

The instantly disclosed method for recovering microbial cells is applicable to any fermentation procedure employed to cultivate microorganisms on carbon-containing substrate materials, e.g., carbohydrate and petroleum substrates. The present recovery method is especially suitable in fermentation processes wherein hydrocarbon feed stocks are employed as the feed. Much of the instant specification will, therefore, be devoted to a description of such a fermentation.

Hydrocarbon feeds which can be utilized in microbiological fermentations are $C_1$–$C_{35}$ petroleum feeds, preferably gas oils boiling in the range of between about 190° C. and about 400° C., preferably between about 190° C. and about 320° C. Other suitable feeds are $C_1$–$C_{35}$ normal and isoparaffins, cycloparaffins, monoolefins, diolefins, aromatics and mixtures thereof. Feeds available in large quantities and those particularly suitable are $C_{11}$–$C_{30}$ normal paraffins from gas oils, light naphthas, and normally gaseous feeds such as methane, ethane and propane and mixtures thereof, such as natural gas. Where normally gaseous feeds are used, these are, of course, preferably supplied as gases directly to the aqueous growth medium through spargers. A still further preferred feed is one which contains a substantial weight percentage, e.g., 70 weight percent, of normal (straight chain) paraffin hydrocarbons having from 1 to 35 carbon atoms. While the presence of branched, non-aromatic hydrocarbons in amounts of up to 30% by weight in the hydrocarbon feed can be tolerated, concentrations in excess of 10 weight percent of non-normal, non-aromatic hydrocarbons are usually avoided since the microorganisms described hereinafter are selective preferentially to normal hydrocarbons, especially short chain ($C_{12}$–$C_{20}$) n-paraffins.

A most preferred hydrocarbon feed is a $C_6$–$C_{30}$ feed stock which has been purified to reduce the level of aromatics, both polycyclic and monocyclic, to below 0.5 weight percent, preferably below 0.1 weight percent, more preferably below about 100 p.p.m.

A preferred process for purifying the hydrocarbon feed is to adsorb the normal hydrocarbons, preferably paraffins, by 5 A., molecular sieves followed by desorption and a clean-up of the desorbed normal hydrocarbons with 13 X sieves or silica gel to adsorb remaining impurities, including aromatics. This process selectively adsorbs the straight-chain hydrocarbons on the molecular sieves and thus purifies them substantially completely from aromatics. A method of carrying out this purification process is described in U.S. Pat. 3,070,542, which is incorporated herein by reference. The clean-up step of the desorbed normal hydrocarbons can be performed in a manner described in co-assigned U.S. patent applications, Ser. No. 223,078, filed Sept. 12, 1962 or Ser. No. 223,057, filed Sept. 12, 1962, which are also incorporated herein by reference.

The purified hydrocarbon feed usually contains about 90+ weight percent of $C_1$–$C_{35}$ n-paraffins and up to about 10 weight percent of n-olefins. The preferred purified hydrocarbon feed contains about 95+ weight percent of $C_{11}$–$C_{30}$ n-paraffins and up to about 5 weight percent normal olefins containing from 11 to 30 carbon atoms. The $C_{11}$–$C_{30}$ n-paraffins feed can be petroleum feeds, e.g., gas oils boiling in the range of between about 190° C. and about 400° C., and more preferably between about 190° C. and about 320° C.

The amount of hydrocarbon feed supplied, based on the total aqueous growth medium supplied, is between about 0.5 and about 10 weight percent, preferably between about 1 and about 5 weight, and especially between about 0.5 and 2 weight percent when straight air is used as the oxygen carrying medium. When using oxygen-enriched gases, e.g., gases having 70+ weight percent oxygen, a preferred amount of hydrocarbon supplied to the reactor is between about 2.0 and about 5.0 weight percent based on total aqueous growth medium. The weight percent of, for example, $C_{11}$–$C_{30}$ normal hydrocarbons actually existing in the slurry zone of the fermentation reactor during cellular growth and activity can range between about 0.01 and about 1.0 weight percent but usually ranges between about 0.01 and about 0.1, preferably between about 0.01 and about 0.05 weight percent, based on the total liquid growth medium.

The improved recovery procedure of the instantly described process is applicable to all microbiological cultivations. Thus, any microorganism which is employed in microbiological cultivations can be recovered by the present improved process. These include bacteria, fungae, and yeases. In the case of biosynthetic processes employing hydrocarbon feeds, any microorganism which is capable of assimilating hydrocarbons can be utilized.

While the present process is applicable to a broad scope of operable microorganisms, there are nine microorganisms which are especially suitable for hydrocarbon assimilation. These microorganisms are tabulated hereinbelow along with their corresponding A.T.C.C. registration numbers, which were secured by depositing samples with the American Type Culture Collection in Washington, D.C.

| Microorganism name | A.T.C.C. number |
|---|---|
| Micrococcus cerificans | 14987 |
| Pseudomonas ligustri | 15522 |
| Pseudomonas pseudomallei | 15523 |
| Pseudomonas orvilla | 15524 |
| Alcaligenes sp. | 15525 |
| Cellumonas galba | 15526 |
| Brevibacterium insectiphilium | 15528 |
| Corynebacterium sp. | 15529 |
| Corynebacterium pourometabollum | 15530 |

It is also to be understood that the particular class and subclass of bacteria utilized is determined by the particular feed employed. For example, when the microorganisms are grown on methane or other gaseous paraffin feeds, the preferred class of microorganism is Pseudomonadaceae, such as *Pseudomonas methanica*. When the biosynthesis is performed using a light naphtha feed, the preferred classes of microorganisms are Pseudomonadaceae and Arthrobacter, such as *Pseudomonas fluorescens, Pseudomonas desmolyticum, Pseudomonasaeruginosa* and *Arthrobacter globiforme*.

In a preferred embodiment, the biosynthesis is conducted using a bacteria inoculant, especially gram negative coccus bacteria; but yeasts can be employed, e.g., *Torulopsis magnolia, Candida albicans* and *Sacchoromyces sp*.

While any aerobic bacteria cells capable of assimilating normal $C_1$ to $C_{35}$ hydrocarbon feeds can be employed, preferred bacteria are as follows: *Micrococcus cerificans (Arthrobacter ureafaciens), Pseudomonas aeruginosa, Pseudomonas fluroescens, Nocardia opaca, Nocardia rubra, Nocardia coralina, Pseudomonas methanica, Pseudomonas desmolyticum* and *Mycobacterium phleie*.

Especially preferred is *Micrococcus cerificans*, isolated and identified by Dr. R. E. Kallio et al., Journal of Bacteriology, vol. 78, No. 3, pages 441–448 (September 1959). Cultures of this organism have been deposited in the American Type Culture Collection, 212 M St., NW., Washington 7, D.C. The full identification of this material is as follows:

Morphology: Cells are small, spherical, tending to be elliptical in old cultures and in media high in nitrogen. Cells from defined media average 0.5 to $1.0\mu$ in diameter, from complex media cell diameters 1.0 to $2.0\mu$. Cells occur singly or in clumps. Immotile, Metachromatic granules and sudanophilic granules are not observed.

Gram reaction: Negative.

Colonies on defined agar are small (1 mm.), circular, convex, having entire edge. Colonies on nutrient agar are larger (2 to 5 mm.) raised mucoid, generally round.

Pigmentation: white, beige or tan variants occur.

Obligately aerobic. A wide variety of materials supports growth, yeast extract, casein hydrolyzate, long-chain alcohols and acids, long-chain normal alkanes and olefins.

Carbohydrate fermentation: No carbohydrates are fermented. Aerobically many carbohydrates are assimilated. These include glucose, maltose, mannitol, sucrose, lactose, arabinose, rhamnose, sorbitol, dulcitol, and inulin. Aerobically glucose is utilized with acid production. Gluconic acid has been identified.

Nitrate reduction: Negative.

Gelatin liquefaction: generally negative. Slow liquefaction may occur in some strains.

Urea hydrolysis: negative or slow hydrolysis.

Catalase is produced.

Hydrogen is not utilized.

Optimal temperature is 25° C.

Optimal growth pH is 7.0 to 8.5.
Source: Iowa soil.
Habitat: Soils.

It is noted that a more recent identification show the organism is probably an Arthrobacter rather than a Micrococcus and closely resembles *Arthrobacter ureafaciens*. The following summary of products indicates the reasons for the preferred identification of this organism as an Arthrobacter:

supplied as ammonium phosphate. When either ammonium phosphate or ammonium acid phosphate is used, it can serve as a combined source of nitrogen and phosphorus (phosphate ion) for microorganism growth. The following table contains a tabulation of the mineral nutrient ions and their amounts conventionally employed in the aqueous growth medium.

Weight percent salts in aqueous medium supplied based on growing 1 weight percent concentration cells.

| Micrococcus | "M. cerificans" | Arthrobacter |
|---|---|---|
| Always gram positive early in fermentation | Always gram negative | Gram negative or variable. |
| Cells in irregular masses | Like Arthrobacter | Short filament formation may occur with some rudimentary budding. |
| Never change size | do | Larger than usual coccoidal cells may appear at times. |
| Never occur in a rod state | do | Large coccoid cells give rise to rod-shaped cells. |
| Carbohydrates frequently fermented | do | Little or no acid from carbohydrates. |

Oxygen is supplied to the cultivation medium in any form capable of being assimilated readily by the inoculant microorganism. Oxygen-containing compounds can be used as long as they do not adversely affect microorganism cell growth and conversion of hydrocarbon feed to microorganism cells. Conveniently, oxygen is supplied as an oxygen-containing gas, e.g., air, which contains between about 19 and about 22 weight percent oxygen. While it is preferably to employ air, oxygen-enriched air having more than 22 weight percent oxygen can be used. In general, between about 0.1 and about 10, preferably between about 0.5 and about 4.0, more preferably between about 0.8 and about 2.5 volumes per minute of air are supplied to the reactor per volume of fermentation bath liquid.

Nitrogen is essential to biosynthesis. The source of nitrogen can be any organic or inorganic nitrogen-containing compound which is capable of releasing nitrogen in a form suitable for metabolic utilization by the microorganism(s) utilized. In the organic category, the following compounds can be listed as exemplary nitrogen-containing compounds which can be used: proteins, acid-hydrolyzed proteins, enzyme-digested proteins, amino acid, yeast extract, asparagine, urea, etc. For reasons of economy, it is usually preferable to employ an inorganic compound such as ammonia, ammonium hydroxide, or salts thereof such as ammonium phosphate, ammonium citrate, ammonium sulfate, ammonium acid phosphate, etc. A very convenient and satisfactory method of supplying nitrogen is to employ ammonium hydroxide, ammonium phosphate or ammonium acid phosphate, which can be added as the salt per se or can be produced in situ in the aqueous fermentation media by bubbling ammonia gas through the broth to which phosphoric acid was previously added, thereby forming ammonium acid phosphate. In this way the pH range of 5.0–8.5 is maintained and the requisite nitrogen is supplied. Ammonium hydroxide can be supplied to the biosynthesis bath in amounts of between about 0.01 and about 1.0 weight percent, preferably between about 0.1 and about 0.15, weight percent nitrogen based on the total fermentation bath.

For proper microorganism growth, it is also necessary to supply requisite amounts of selected mineral nutrients to the biosynthesis bath. Thus, potassium, sodium, iron, magnesium, calcium, manganese, phosphorus and other nutrients are included in the aqueous growth medium. These necessary materials can be supplied in the form of their salts, and preferably their water-soluble salts. For example, the potassium can be supplied as potassium chloride, phosphate, sulphate, citrate, acetate, nitrate, etc. Iron and phosphorus can be supplied in the form of sulphates and phosphates, respectively, e.g., iron sulphate and iron phosphate. Usually most of the phosphorus is Mineral:

| | |
|---|---|
| $H_3PO_4$ P | 0.01–1.0 |
| $Na_2SO_4$ S & Na | 0.01–0.5 |
| KCl K & Cl | 0.01–0.5 |
| $MgSO_4$ Mg | 0.005–0.5 |
| $CaCl_2$ Ca | 0.005–0.5 |
| $FeSO_4$ Fe | 0.001–0.1 |
| $MnSO_4$ Mn | 0.001–0.1 |

In all the above, the ions indicated can be supplied as other salts in amounts stoichiometrically the same (by calculation).

The temperature at which microbiological cultivations are performed can vary between about 20° C. and about 55° C. depending upon the specific microorganism being utilized; but, usually temperatures of between about 20° C. and about 45° C. are employed. Preferably, the fermentation is conducted at temperatures of between about 25° C. and about 40° C.

The pH of the aqueous growth medium is generally held at between about 5.0 and about 8.5. If the pH becomes too high, it can be lowered readily by the addition of a suitable acid to the fermentation media, e.g., $H_3PO_4$. In like manner, if the pH becomes too low, it can be raised by the addition of a suitable base, e.g., ammonia or ammonium hydroxide.

At the start-up of cultivation, the growth medium is inoculated with the microorganism utilized, e.g., by the use of a previously cultivated batch inoculum in the same media in which it is to be grown. Other inoculation procedures can be employed, e.g., use of an inoculum where said microorganism is previously grown on a media different from that in which the fermentation is to be conducted and then transferred to the fermentation vessel(s) etc.

The reactor can be stirred during biosynthesis by any conventional means such as a paddle stirrer, propeller-type stirrer, rockers, stirrers or other agitator means which completely disperse the oxygen, hydrocarbon, microorganism and essential cell nutrients. For example, paddle stirrers can be used having a horsepower rating of 1–100, preferably 5–30, per 1,000 gallons of liquid reactant medium. Preferred rates of stirring with a paddle stirrer are above 1,000 r.p.m., preferably above 1,500 r.p.m.

The liquid residence time for a bacteria such as *Micrococcus cerificans* (*Arthrobacter ureafaciens*), i.e., the volume of liquid in the reactor divided by the amount of the material supplied (and products removed so as to maintain a constant liquid level in the reactor) per hour is, in general, 1 to 10 hours, preferably 1 to 3 hours more, more preferably 1.5 to 2.5 hours. The present process can, of course, be carried out by batch or continuous means.

The present process is more particularly described in the following examples which are intended as illustrative only since numerous modifications and variations therein will be apparent to those skilled in the art.

EXAMPLE 1

*Micrococcus cerificans* is continuously grown in an aqueous biosynthesis bath containing 1.0 weight percent n-hexadecane (Matheson Practical Grade n-hexadecane) as the hydrocarbon feed media.

A 7.5 liter biosynthesis reactor vessel is charged with 4 liters of aqueous growth medium containing 1.0 weight percent *Micrococcus cerificans* bacteria as inoculant. Sufficient air is bubbled through the inoculant slurry to satisfy the Bacterial Oxygen Demand prior to introducing the hydrocarbon and inorganic salts growth feeds (the latter containing phosphoric acid and ammonium hydroxide). A typical biosynthesis bath composition at a given typical stage of a continuous biosynthesis campaign is as follows:

| Components: | Grams/liter |
|---|---|
| n-Hexadecane | 10 |
| $H_3PO_4$ | 5 |
| KCl | 1 |
| $CaCl_2$ | 0.5 |
| $MgSO_4 \cdot 7H_2O$ | 0.2 |
| $MnSO_4 \cdot 4H_2O$ | 0.2 |
| $FeSO_4 \cdot 7H_2O$ | 0.2 |
| NaCl | 0.2 |
| $NH_4OH$ sufficient amount added to maintain pH at 7.0 | |

The biosynthesis bath growth temperature is maintained at 35° C. (95° F.), plus or minus 2° C., and the pH of the biosynthesis bath is maintained essentially neutral, viz, at a pH of 7.0 plus or minus 0.1, throughout biosynthesis. The conversion of hydrocarbon feed to cells is maintained at 90 percent and higher. After a residence time of approximately 2 hours, a product stream aqueous slurry is continuously withdrawn from the biosynthesis bath. This product stream aqueous slurry contains approximately 1 percent by weight of bacteria cells, along with unconverted hydrocarbon, inorganic salts, nutrients, etc.

EXAMPLE 2

Run 1

A small glass column with a feed port in the center and take-offs at the top and bottom was charged with 30 cc. of the product stream aqueous slurry from the biosynthesis reactor of Example 1. Ten cc. of methylene chloride (dichloromethane) were then added to the glass column and thoroughly admixed with the aqueous slurry. Admixing temperature was about 70° F. Agglomeration of the microorganism cells in the methylene chloride occurred spontaneously upon introduction of the methylene chloride. The admixture was then permitted to settle for about 30 minutes. Most of the aqueous phase remained as supernatant. The resulting organic phase was separated from the aqueous phase and the microorganism cells recovered by stripping to remove methylene chloride and occluded water. Substantially all of the microorganism cells present in the original aqueous slurry were recovered. About 40% of the original aqueous slurry was present in the agglomerated product.

Run 2

The procedure of Run No. 1 was repeated except that 30 cc. of methylene chloride were employed. Substantially all of the microorganism cells were removed from the aqueous slurry and about 42 percent of the original aqueous slurry was present in the agglomerated product.

Run 3

The procedure of Run No. 1 was repeated except that 90 cc. of methylene chloride were employed. Substantially all of the cells were removed from the aqueous slurry and about 50% of the original aqueous slurry was present in the agglomerated product.

EXAMPLE 3

The procedure of Example 2, Run 1, was repeated respectively with 10, 30 and 90 cc. of methylene chloride at a mixing temperature of about 110° F. Substantially all of the cells were removed from the aqueous slurry in each of the three runs. The amount of original aqueous slurry present in the agglomerated product was about 20, 23 and 30 weight percent respectively for the runs employing 10, 30 and 90 cc. of methylene chloride.

EXAMPLE 4

The procedure of Example 2 was repeated separately with chloroform, carbon tetrachloride, carbon disulfide, and toluene. Similar results as those obtained in Examples 2 and 3 were obtained with each of the solvents employed in this example.

EXAMPLE 5

The procedure of Example 2, Run 1, was repeated with acetone, ethanol, hexane and Varsol (an aliphatic hydrocarbon solvent). None of these organic liquids caused agglomeration of the microbial product cells and thus did not effectuate separation of the cells from the aqueous slurry. Acetone and ethanol are miscible with the aqueous slurry, while hexane and Varsol do not preferentially wet the microorganisms.

While there are above-described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. In a biosynthesis fermentation wherein *Micrococcus cerificans* is cultivated in an aqueous growth medium containing a source of carbon, hydrogen, oxygen and essential cell nutrients, the process for the recovery of said cultivated *Micrococcus cerificans* from said aqueous growth medium which comprises adding to said aqueous growth medium an immiscible organic liquid which preferentially wets said *Micrococcus cerificans* to form an aqueous phase and an organic phase, and recovering said *Micrococcus cerificans* from said organic phase.

2. A process according to claim 1 wherein said organic liquid is added at a temperature of between about 20° C. and about 55° C.

3. A process according to claim 1 wherein said organic liquid has a density greater than that of said aqueous medium.

4. A process according to claim 1 wherein said organic liquid is a $C_1$–$C_4$ halogenated aliphatic hydrocarbon.

5. A process according to claim 1 wherein said organic liquid is selected from the group consisting of chloroform, methylene chloride, carbon tetrachloride, carbon disulfide and toluene.

6. A process of claim 1 wherein said organic liquid has a heat of vaporization less than that of water.

7. A process according to claim 1 wherein the volumetric ratio of said organic liquid added to said aqueous growth medium is between about 1:20 and about 100:1.

8. A process according to claim 1 wherein the volumetric ratio of said organic liquid added to said aqueous growth medium is about 1:3.

9. A process according to claim 1 wherein said organic liquid is in contact with the aqueous medium for a time period of between about 1 minute and about 1 hour.

References Cited
UNITED STATES PATENTS

| | | | |
|---|---|---|---|
| 2,764,521 | 9/1956 | Leviton | 195—96 |
| 3,089,821 | 5/1963 | Folkers | 195—96 |
| 3,268,419 | 8/1966 | Champagnat et al. | 195—28 |
| 3,347,688 | 10/1967 | Frankenfeld et al. | 195—104 |
| 3,009,861 | 11/1961 | Alderton et al. | 195—101 |
| 3,357,895 | 12/1967 | Cherry | 195—81 |
| 3,361,641 | 1/1968 | Fare | 195—81 |

ALVIN E. TANENHOLTZ, Primary Examiner

U.S. Cl. X.R.

99—9; 195—1, 3, 82